(12) United States Patent
Stoiber et al.

(10) Patent No.: US 8,985,308 B2
(45) Date of Patent: Mar. 24, 2015

(54) APPARATUS FOR SORTING PREFORMS

(75) Inventors: Christian Stoiber, Michelsneukirchen (DE); Erik Blochmann, Neutraubling (DE); Andreas Brunner, Aufhausen (DE); Hans-Juergen Fleischmann, Steinberg am See (DE); Peter Kirsch, Schoenhofen (DE); Werner Roessler, Alteglofsheim (DE); Heinrich Deyerl, Teunz (DE); Florian Geltinger, Neufahrn (DE)

(73) Assignee: Krones AG, Neutraubling (DE)

( * ) Notice: Subject to any disclaimer, the term of this patent is extended or adjusted under 35 U.S.C. 154(b) by 0 days.

(21) Appl. No.: 12/251,089

(22) Filed: Oct. 14, 2008

(65) Prior Publication Data

US 2009/0095598 A1    Apr. 16, 2009

(30) Foreign Application Priority Data

Oct. 11, 2007   (DE) .......................... 10 2007 049 009

(51) Int. Cl.
| | |
|---|---|
| B65G 47/00 | (2006.01) |
| B65G 47/14 | (2006.01) |
| B65G 47/24 | (2006.01) |
| B29C 49/42 | (2006.01) |

(52) U.S. Cl.
CPC ........ B65G 47/1464 (2013.01); B29C 49/4205 (2013.01); B29C 2049/4231 (2013.01)
USPC .................................................. 198/397.05

(58) Field of Classification Search
None
See application file for complete search history.

(56) References Cited

U.S. PATENT DOCUMENTS

| | | | | |
|---|---|---|---|---|
| 3,282,464 | A | * | 11/1966 | Kohl et al. .......................... 221/1 |
| 4,709,798 | A | * | 12/1987 | Herzog ........................... 198/380 |
| 6,691,855 | B1 | * | 2/2004 | Takahashi et al. ............ 198/396 |
| 6,973,767 | B2 | * | 12/2005 | Wagner et al. ................... 53/544 |
| 2004/0200190 | A1 | | 10/2004 | Wagner et al. |

FOREIGN PATENT DOCUMENTS

| | | |
|---|---|---|
| DE | 20212930 | 9/2003 |
| DE | 20212930 U1 | 9/2003 |
| DE | 102005048126 A1 | 4/2007 |
| EP | 1592630 A1 | 11/2004 |
| EP | 1650143 A1 | 4/2006 |

(Continued)

OTHER PUBLICATIONS

European Search Report for European Patent Application No. 08165966.6, dated Dec. 19, 2008.

(Continued)

*Primary Examiner* — Kavel Singh
(74) *Attorney, Agent, or Firm* — Onello & Mello, LLP

(57) ABSTRACT

An apparatus for sorting piece goods may include a receiving surface which can rotate about a predefined rotation axis and is designed to receive the piece goods. The apparatus may include a first guide rail for guiding the piece goods, wherein this guide rail has a gap through which one region of the piece goods passes and by means of which another region of the piece goods is held. The apparatus may include a turning device which pivots the piece goods with respect to a longitudinal direction of the piece goods. The apparatus may include a separating device which separates out some of the sorted piece goods which are not guided in a predefined manner by the first guide rail or by the turning device. The turning device may be arranged upstream of the separating device in the movement direction of the piece goods.

19 Claims, 6 Drawing Sheets

(56) References Cited

FOREIGN PATENT DOCUMENTS

| EP | 1690813 A1 | 8/2006 |
|----|------------|--------|
| EP | 1921028 A1 | 5/2008 |
| GB | 1118952 | 7/1968 |
| JP | 1-111643 A | 4/1989 |
| WO | 2004069700 A1 | 8/2004 |
| WO | 2005061352 A1 | 7/2005 |
| WO | 2006/084831 | 8/2006 |

OTHER PUBLICATIONS

Chinese Office Action issued Aug. 5, 2013 in corresponding Chinese Application No. 2008101703649.
Documents in connection with Opposition Proceedings in Related European Patent No. 2048097 as follows: Chronological Table, Opposition Proceedings Document Dated Jan. 27, 2012; Filing of an opposition against patent including reasons, Opposition Proceedings Document Dated Jul. 16, 2012; Filing of a response to opposition by patent owner, Opposition Proceedings Document Dated Oct. 8, 2012; Preliminary opinion of European Patent Office.

* cited by examiner

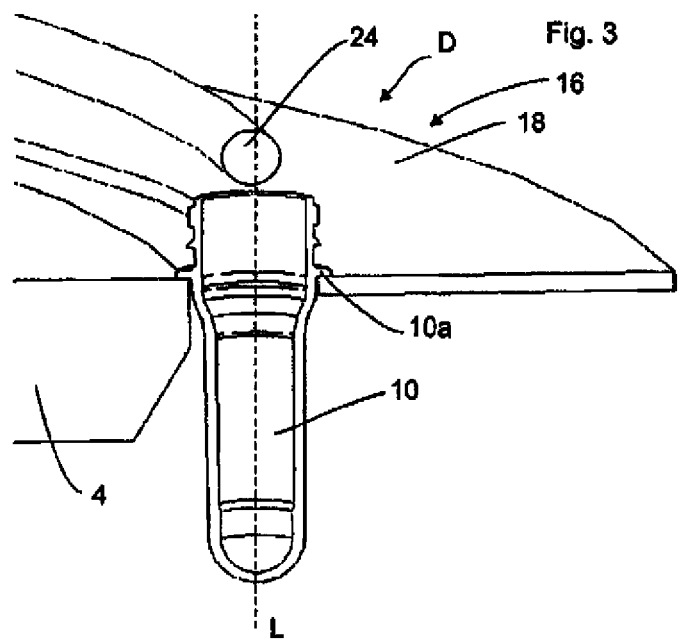
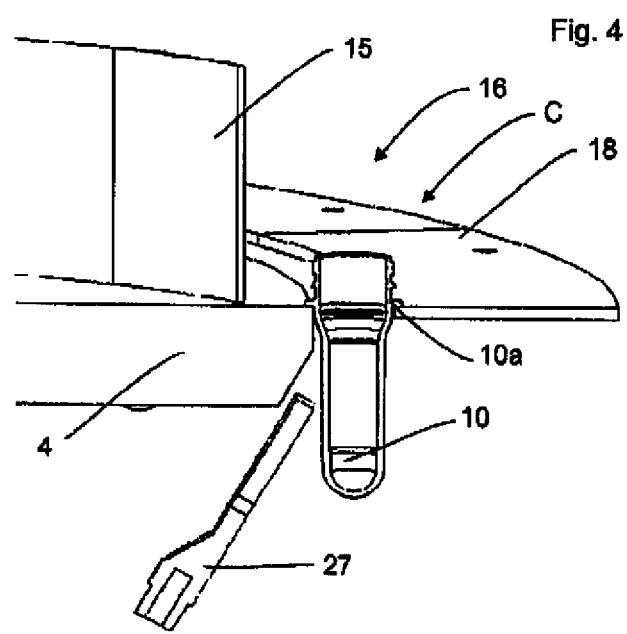

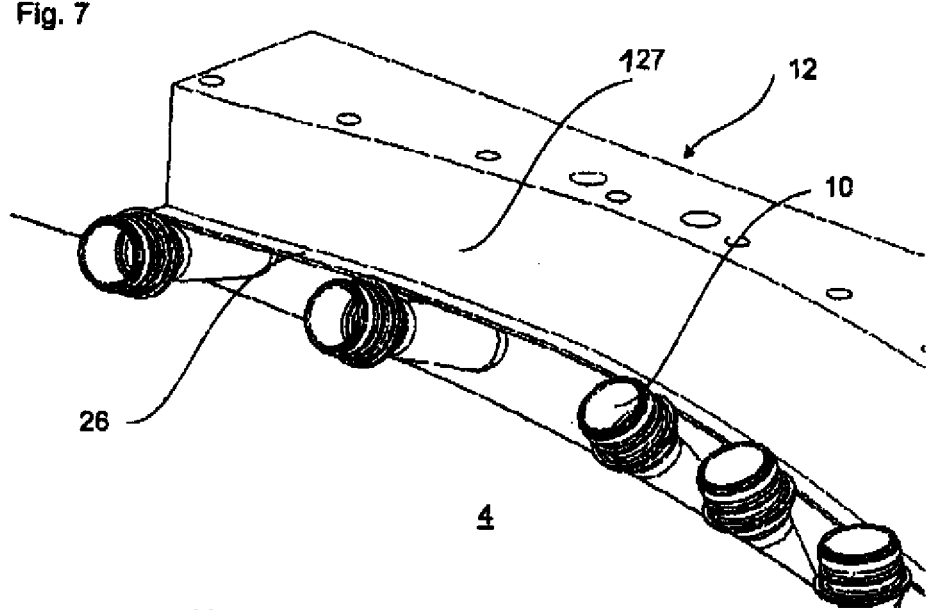
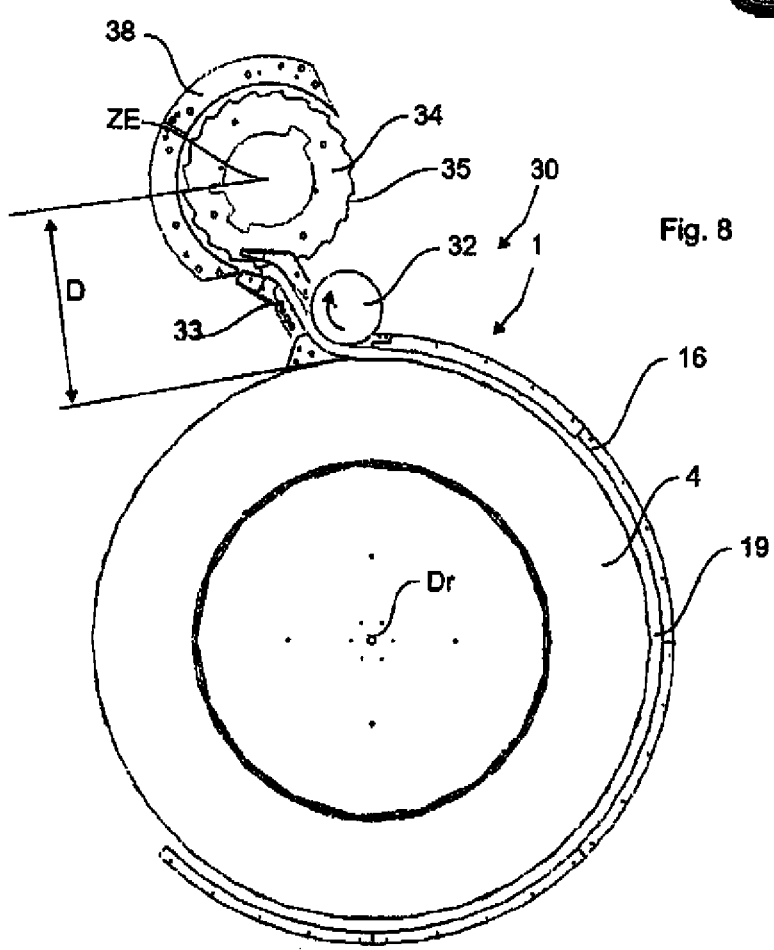

APPARATUS FOR SORTING PREFORMS

CROSS-REFERENCE TO RELATED APPLICATION

This application claims the benefit of priority of German Patent Application No. 10 2007 049 009.9, filed Oct. 11, 2007, pursuant to 35 U.S.C. 119(a)-(d), the disclosure of which is incorporated herein by reference in its entirety as if fully set forth herein.

TECHNICAL FIELD

The present disclosure relates to an apparatus and to a method for sorting performs. However, it is pointed out that the apparatus according to the invention and the method according to the invention are also suitable for sorting other bodies and in particular other elongate bodies with an external profile.

BACKGROUND

The aforementioned preforms are used in the prior art in beverage production, in order subsequently to be expanded to form beverage containers. It is customary for these containers to pass initially in an unordered fashion onto a sorting device, and in this sorting device to be oriented in a predefined manner in order then to pass in a sorted fashion to a further installation, such as a blowing machine.

EP 1 592 630 B1 discloses an orienting device for bottle preforms for passing through a blowing machine. In said document, a movable inclined device is provided which has a plurality of cells which are intended to hold in each case one preform in a horizontal position. The preforms thus held in the horizontal position are conveyed into a guide slot in which they are rotated due to the particular configuration of this slot and then are conveyed further in this rotated position.

EP 1 690 813 A1 discloses an apparatus and a method for aligning elongate, preferably cylindrical objects having a profiled contour. In this apparatus, the preforms are placed on a rotating disc, pushed outwards by means of the centrifugal force and finally guided into a guide channel. In this apparatus, too, the preforms are rotated or tilted about their longitudinal axis. Prior to tilting, those preforms which are not arranged in a certain desired position with respect to the guide rail are separated out. In order to increase the efficiency of this apparatus, a first guide element is provided, wherein between this guide element and the rotating disc there is a gap which allows the main body of the preforms to pass, but not the respective supporting collar of these preforms. In addition, an additional element is provided which is arranged radially inside the guide element and which brings about a pre-orientation of the preforms.

DE 10 2005 048 126 A1 discloses a method and an apparatus for sorting preforms. Here, the preforms are fed for sorting purposes to a rotatable rotor which positions the preforms along a stationary guide rail under the effect of the centrifugal force, wherein a separation of the preforms is carried out at the outer circumference of this rotor.

It may therefore be desirable to provide an apparatus for sorting preforms which allows a higher operating speed compared to the prior art.

SUMMARY OF THE INVENTION

An apparatus according to the invention for sorting piece goods, and in particular preforms, comprises a receiving surface which can rotate about a predefined rotation axis and is designed to receive the piece goods. Also provided is a first guide rail for guiding the piece goods, wherein the guide rail forms a gap through which one region of the piece goods passes and by means of which another region of the piece goods is held. Also provided is a turning device which pivots the piece goods with respect to a longitudinal direction of the piece goods. Finally, a separating device is provided which separates out some of the sorted piece goods. According to the invention, the turning device is arranged upstream of the separating device in the movement direction of the piece goods. According to various aspects, the first guide rail forms the gap with the upper face of the receiving surface.

The receiving surface thus serves on the one hand for (pre-)sorting the preforms, but on the other hand also—for example, by means of its outer circumference—for retaining the latter. According to various aspects, the preforms are loosely retained. According to some aspects, the receiving surface is arranged horizontally, but may also be arranged at an angle other than 0° with respect to the horizontal, with an inclination of between about 5° and about 30° then being exemplary.

A guide rail is understood to mean a rail delimited on both sides by a wall, wherein the preform can be guided between these two walls. The main body of this preform, which usually has a smaller cross section than its mouth collar for example, can pass through this gap and the collar is held at the gap. In this way, the preform is usually also brought into a predefined position, since the centre of gravity of the preform is located below the aforementioned circumferential collar. In particular, that portion of the piece goods which are not correctly guided by the guide rails or the turning device are separated out. According to various aspects, correct guidance in the first guide rail is understood to mean that the preforms are oriented horizontally and substantially in a radial direction. Correct guidance in the second guide rail is understood to mean that the preforms are guided in a vertical orientation.

The piece goods or the preform usually have a longitudinal direction which at the same time may also be an axis of symmetry of the preform. The preform is pivoted by the turning device in such a way that the longitudinal direction itself is pivoted by a predefined angle, for example by 90°. It is thus possible to transfer the preform from a horizontal position to a vertical position. The apparatus may comprise a plurality of separating devices, wherein each of these separating devices is arranged after the turning device in the transport direction of the preforms.

In the prior art, if any separating devices are provided at all, these are arranged in front of the turning unit. Furthermore, in the prior art, the turning unit is designed as a so-called closed unit, that is to say that the preform is already guided within the turning unit into an exact ordered position with respect to the guide rail, wherein it also cannot leave this position. By virtue of the inventive arrangement of the turning device upstream of the separating device, the turning unit itself can be configured freely, i.e. without a delimiting element which prevents any exit of the piece goods out of the guide rail. Due to the resulting possible configuration of the turning device, a higher throughput of the turning device can be achieved, so that a higher operating speed is possible in the region of the turning device, which is often an element that limits the operating speed.

In one exemplary embodiment, the turning device is adjoined by a second guide rail, wherein the second guide rail likewise forms a gap through which one region of the piece goods passes and by means of which another region of the piece goods is held. According to various aspects, as mentioned above, the first guide rail and the second guide rail are rotated with respect to one another in such a way that the piece goods are conveyed in the vertical position in the second guide rail, whereas in the first guide rail they are conveyed in a horizontal position. According to some aspects, the second guide rail is formed by an outer circumference of the receiving surface.

The apparatus as a whole may have a modular structure. It is thus possible for example for the preforms to be stored in a storage unit and then to be transported to the receiving surface by means of a conveying unit which is likewise designed as a module. By virtue of the modular structure, it is also possible for different units to be combined with one another.

In a further exemplary embodiment, movement-promoting devices are provided along the second guide rail and promote the movement of the piece goods in the movement direction. It is thus possible for example for the piece goods to be conveyed by a directional flow of air, wherein suitable air flow nozzles may be arranged within the movement path of the piece goods or also outside said path. It would also be possible to promote the movement of the preforms by means of brushes, which may be arranged inside or outside the movement path, or also by means of followers arranged inside or outside. The edge of the receiving surface, which with particular preference is designed as a disc, could also be designed tribologically in such a way that the coefficient of friction between the piece goods and the receiving surface is increased so that the movement is accelerated.

The apparatus according to the invention thus has a sorting region in which the preforms are first sorted. This sorting region merges directly into the turning device. Unsorted preforms are not separated out until the region of the second guide rail which adjoins the turning device ("settling section"). It is possible for one or more guide plates to be provided which are guided as far as a predefined region of the receiving surface or close to the latter. These guide plates may be adjoined by a retaining section, within which the preforms are prevented from sliding out of the guide rail in their longitudinal direction for example via a holding-down device above the mouth of the preforms.

In addition, it is possible that a pre-sorting of the preforms, for example by means of second guide plate arranged in a circular manner, is carried out in the interior of the receiving surface.

In a further exemplary embodiment, a conveying device such as a transport belt is provided which feeds the preforms to the receiving surface. In this case, a holding container for the preforms may be provided, from which the preforms are conveyed onto the receiving surface.

In a further exemplary embodiment, the gap of the second guide rail is formed by an at least partially annular body, wherein at least one section of this annular body can be moved in a direction running radially with respect to the receiving surface. In the aforementioned second guide rail, several preforms may occasionally become stuck together. By radially displacing said section, the size of the gap can be increased in such a way that the preforms which are stuck together can drop downwards and thus be discarded. Only one design possibility for increasing the size of the gap for discarding purposes is specified here. However, other solutions are of course also conceivable. The point is merely that the size of the gap can be increased in order to eliminate disruptions by removing the preforms located in the region of the adjustable segment. By virtue of this displaceable outer segment, in particular in the region of the start of a holding-down device, disruptions caused by sticking together can thus be eliminated automatically without any intervention by the operator.

According to various aspects, such disruptions are detected via light barriers or similar sensor devices.

According to some aspects, a holding-down element is provided in at least one section of the second guide rail and prevents the piece goods from sliding out of the second guide rail in their longitudinal direction. In these regions of the holding-down element, the piece goods are thus held in a certain position with respect to the guide rail and can thus move essentially only along this guide rail. According to various aspects, all possible disruptions are already eliminated before this holding-down element, so that only those piece goods which lie in a certain way in the second guide rail slide below the holding-down element.

In a further exemplary embodiment, the turning device is configured without a holding-down device, that is to say that in this case preforms which are not correctly ordered may also be present.

In a further exemplary embodiment, the apparatus comprises at least one sensor device which detects a position of the piece goods with respect to at least one guide rail. By virtue of this sensor device, various incorrect arrangements of the piece goods with respect to the guide rail can be detected, such as for example tilted piece goods, piece goods which are stuck inside one another and the like.

In a further exemplary embodiment, the apparatus comprises a feed device for feeding the piece goods to the receiving surface, wherein an end section of this feed device is spaced apart from the receiving surface by less than 300 mm, in some aspects by less than 200 mm, and in some aspects by less than 150 mm. The piece goods, that is to say in particular the preforms, are thus placed on the receiving surface at a relatively small distance therefrom, wherein the sorting process can also be aided by a suitably small falling height. According to various aspects, the preforms are fed to the receiving surface in a radial direction of the latter. With particular preference, the region of the feed device in which the preforms fall onto the receiving surface is arranged outside the geometric centre of the receiving surface, and the feed device runs as mentioned above substantially in the radial direction with respect to the receiving surface.

In a further exemplary embodiment, the apparatus comprises a blowing-out device which blows a predefined portion of the piece goods out of the second guide rail. In this case, too, sensor devices can be used to ascertain that certain piece goods are not correctly located in the rail or that for example two preforms are stuck together. In this case, such incorrectly arranged piece goods can be blown upwards out of the second guide rail via the blowing-out device which may be arranged below the guide rail.

The blowing-out device may be activated via sensor devices such as light barriers and an upstream valve.

In a further exemplary embodiment, the speed of rotation of the rotatable receiving surface can be adjusted. In this way, the retained end of the piece goods in the region of the above-mentioned holding-down element can be fixed by changing the speed of rotation of the receiving surface, or a control in principle of this retained end is possible by controlling the speed of rotation of the receiving surface, optionally also with a corresponding adjustment of a dispensing belt drive which conveys the piece goods onto the receiving surface. Both the speed of rotation of the receiving surface and also the conveying speed of the loading system for the preforms may thus be combined in the control system.

The present invention also relates to an installation for sorting piece goods, comprising an apparatus of the type described above and also a synchronisation star wheel which is arranged downstream with respect to the movement direction of the piece goods and which picks up the piece goods from the apparatus. Via this synchronisation star wheel, the piece goods can be transferred individually to a further machine, such as a blowing machine for example.

According to various aspects, a driven wheel is provided between the apparatus and the synchronisation star wheel and moves the piece goods at least partially. This may be a retaining wheel which aids the synchronisation. According to various aspects, the synchronisation star wheel is a sawtooth star wheel. In a further exemplary embodiment, the distance between the centre of this synchronisation star wheel and the apparatus, that is to say the outer circumference thereof, is less than 2000 mm and in some aspects less than 1500 mm. The aforementioned synchronisation star wheel is thus located in the direct vicinity of the receiving surface.

In a further exemplary embodiment, a transfer rail is provided between the apparatus and the synchronisation star wheel, and provided on this transfer rail are a large number of air discharge openings which promote the movement of the piece goods. Via the aforementioned driven wheel and/or the transfer rail, a retaining pressure can be generated via a form fit and/or friction fit in front of the synchronisation star wheel. According to some aspects, the aforementioned transfer rail has air discharge openings both above and below the support ring of the corresponding preforms. In this case, the distance between that region in which the synchronisation star wheel comes into engagement with the preforms and the end of the aforementioned pressure shaft or the end of the last air discharge openings is less than 300 mm. In principle, however, it is sufficient to provide only a system which generates a retaining pressure in front of the synchronisation star wheel.

The present disclosure also relates to a method for sorting piece goods and in particular preforms, wherein the piece goods are placed on a rotatable receiving surface and from there pass into a first guide rail. Furthermore, the piece goods are pivoted about their longitudinal direction by means of a turning device, and some of the sorted piece goods which are not guided in a predefined manner by the guide rails are separated out by means of at least one separating device. According to the disclosure, the piece goods pass firstly through the turning device and only then through the separating device. In the method according to the disclosure, therefore, as yet unsorted and thus also in some cases incorrectly oriented piece goods are also conveyed in the region of the turning device. By virtue of the method according to the disclosure, higher operating speeds can be achieved. A pivoting about the longitudinal direction is understood to mean that the piece goods are pivoted in their entirety, so that the orientation of the longitudinal direction changes as a result of the pivoting process.

Further embodiments and advantages will emerge from the appended drawings.

BRIEF DESCRIPTION OF THE DRAWINGS

In the drawings:

FIG. 3 shows a detail view of a region of the apparatus of FIG. 1;

FIG. 4 shows a further detail view of the apparatus of FIG. 1;

FIG. 7 shows a further detail view of the turning device;

FIG. 8 shows a diagram of an installation according to the invention;

DETAILED DESCRIPTION

Figure 1:
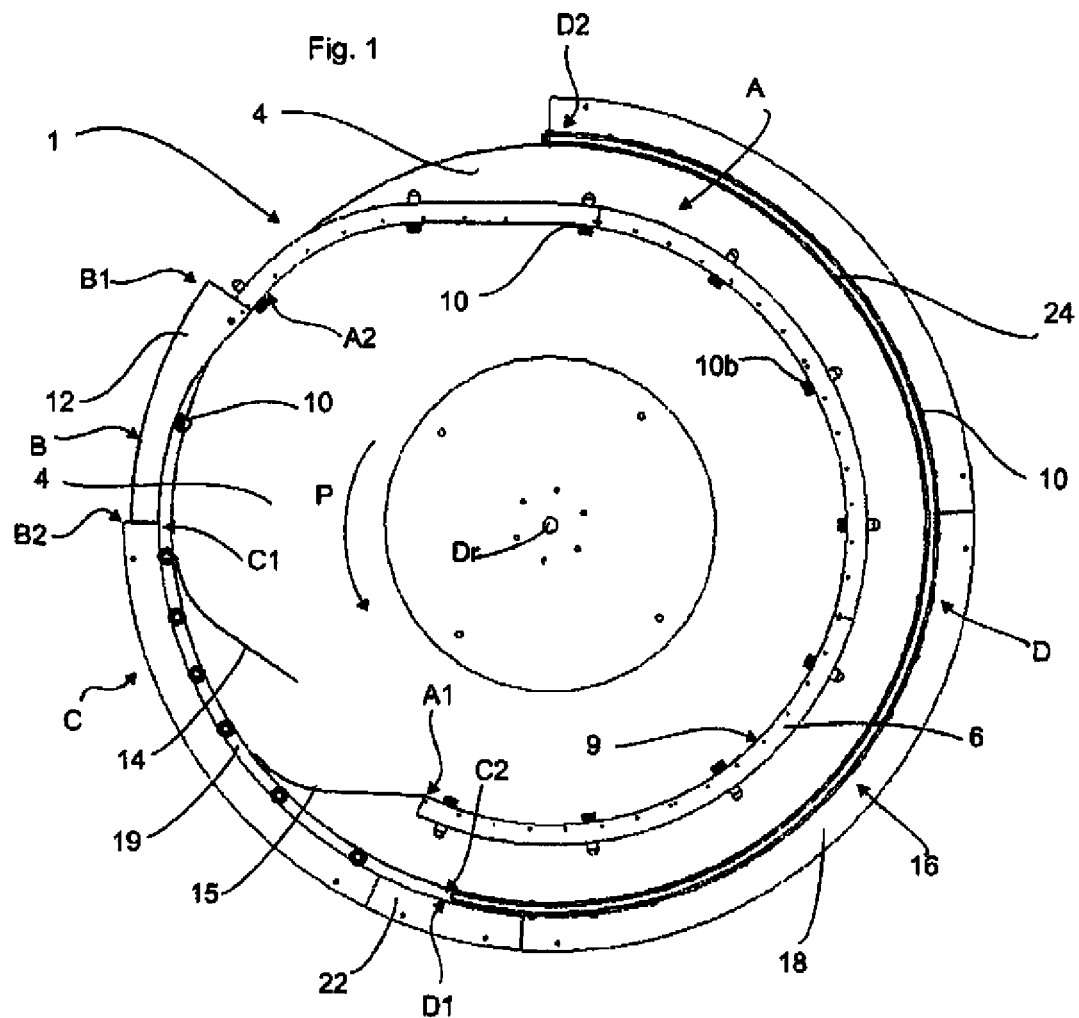
FIG. 1 shows a plan view of an apparatus according to the invention.

FIG. 1 shows a plan view of an apparatus 1 according to the invention for sorting piece goods 10. This apparatus 1 comprises a rotatable receiving surface 4 or receiving disc for the piece goods 10. In the embodiment shown in FIG. 1, this receiving surface 4 rotates in the anticlockwise direction during operation, that is to say in the direction of the arrow P about the axis of rotation Dr. In one exemplary embodiment, it is possible that this receiving surface 4 has a curved profile, that is to say protrudes upwards in the centre and is lowered towards the edges. However, it would also be possible to configure this receiving surface 4 as a flat surface in another exemplary embodiment. If the receiving surface 4 is flat, one exemplary further development of the invention consists in arranging it horizontally, with it also being conceivable to arrange it at an angle with respect to the horizontal. One exemplary inclination is between about 5° and about 30° with respect to the horizontal.

Via a feed device (not shown), the piece goods 10, in this case therefore the preforms, are fed in an unsorted fashion to the receiving surface 4. The receiving surface may be made from various materials, such as e.g. stainless steel or else alloys, or it may have an anti-friction coating such as e.g. a chromium-containing anti-friction coating.

By virtue of the centrifugal force, the preforms 10 pass firstly to a first guide rail 6, which is arranged here in a stationary manner and has a partially circular profile. The actual sorting process thus begins at the starting point denoted by reference A1 and ends at the end point denoted by reference A2. The region between the points A1 and A2 is thus the sorting region A. In FIG. 1, all the preforms 10 are already correctly arranged with respect to the first guide rail 6. This position may also be obtained due to the fact that the preforms have a centre of gravity which lies below the thread 10b of the preforms and thus results in an orientation in the radial direction in the manner shown in FIG. 1.

Nonetheless, a considerable number of preforms will also arrive at the end point A2 in an unsorted fashion. For instance, it is possible for a number of preforms to be stuck inside one another, or for the preforms not yet to be radially oriented or to be tilted to the side with respect to the first guide rail 6. The first guide rail is arranged above the receiving surface 4 and a gap 9 is formed between the receiving surface 4 and the first guide rail 6.

Figure 2:
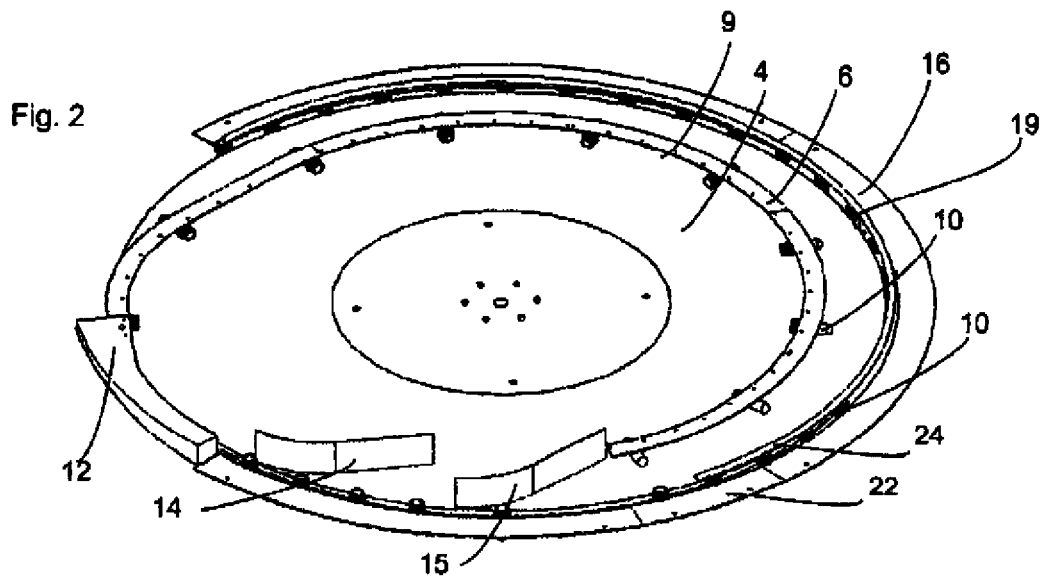
FIG. 2 shows an oblique view of the apparatus of FIG. 1.

The sorting region A is adjoined by a turning region B, in which the preforms are rotated by their longitudinal direction. The starting point of this turning region is denoted by reference B1 and the end point is denoted by reference B2. Accordingly, reference 12 denotes the turning device. The turning region B is in turn adjoined by a settling section C, wherein the start of this settling section is denoted by reference C1 and the end of the settling section is denoted by reference C2. In this region C, unsorted preforms 10 are also separated out. FIG. 2 shows two separating devices in the form of separating plates 14, 15 which channel incorrectly arranged preforms radially inwards and thus feed them back to the first guide rail 6 and the sorting region A. These separating devices 14, 15 may have a straight region and a curved region.

The separating region or the settling section C is adjoined by a retaining section D, the start of which is denoted by reference D1 and the end of which is denoted by reference D2. Within this retaining section D, the preforms 10 are already sorted and are arranged in the desired position one behind the other. At the end of the retaining section D, that is to say after the point D2, the preforms 10 are passed to the above-mentioned synchronisation star wheel 34.

Reference 16 denotes the second guide rail, wherein this second guide rail has a gap 19 which is formed by a ring 18 and the outer circumference of the receiving surface 4. Reference 22 denotes a segment of this ring 18 which can be moved radially outwards.

Between the turning device 12 and the separating element 14, there is a gap through which preforms 10 can pass outwards from the receiving surface 4 as a result of the centrifugal force. This gap is relatively small in FIG. 1. It may be designed to be larger or smaller by a different arrangement of the separating elements 14, 15.

FIG. 2 shows an oblique view of the apparatus shown in FIG. 1. It is possible to see here both the gap 9 which is formed between the receiving surface 4 and the first guide rail 6. This gap 9 is formed here in a direction substantially perpendicular to the receiving surface.

It is also possible to see the gap 19 which is formed by the second guide rail 16. In addition, a holding-down element 24 is provided which holds down the individual containers 10 in a section between the points D1 and D2 of the second guide rail 16. Besides the separating devices 14 and 15 shown in FIG. 2, a plurality of separating devices could also be provided.

FIG. 3 shows a detail view of the second guide rail 16 in the region D in which the holding-down element 24 is provided. It can be seen that the holding-down element 24 is likewise in the shape of an annular segment and also has here a circular cross section. The holding-down element 24 is arranged above the preform 10 and thus prevents the latter from being able to slide in its longitudinal direction L out of the guide rail 16. It can be seen that the preform is supported by its support ring 10a at one side with respect to the annular segment 18 and at the other side with respect to the receiving surface 4 and is guided in this way.

FIG. 4 shows a further detail view of the apparatus 1 according to the invention in the region C. More specifically, this is a section in the region between the points C1 and C2 of FIG. 1, that is to say a region in which the holding-down element 24 is not yet present. Reference 27 denotes a blowing-out unit which is arranged below the guide rail and which is suitable for blowing any incorrectly positioned preforms 10 out of the guide rail 16. By arranging the blowing-out device 27 in a region in which the separating device 15 is also arranged, the preforms 10 can be hurled away radially outwards with respect to the apparatus.

According to various aspects, the apparatus also comprises a sensor device (not shown) which detects incorrect positions in relation to certain preforms 10 and outputs to the blowing-out unit 27 the corresponding signal to blow at least also this incorrectly oriented preform 10 out of the rail 16. In this case, as shown in FIG. 4, this blowing-out device 27 is inclined with respect to the plane of the receiving surface 4, so that the preform 10 tends to be hurled radially outwards. It would also be possible to provide a plurality of such blowing-out devices 27 one behind the other.

Figure 5:
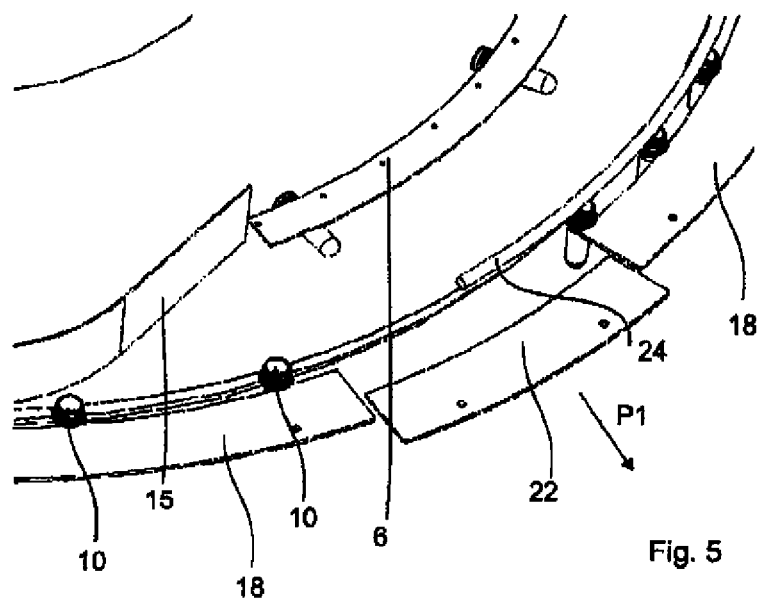
FIG. 5 shows a detail view of the apparatus of FIG. 1.

FIG. 5 shows a further detail view of the apparatus according to the invention in the region C. It can be seen that the ring 18 which forms the second receiving rail 16 has a segment 22 which can be pushed outwards in the radial direction, that is to say in the direction of the arrow P1. During operation, it is possible for congestion or sticking-together to occur in particular in front of the holding-down element 24. In order to eliminate this sticking-together, the segment 22 is pushed radially outwards and all of the containers 10 accumulated in this region can drop downwards out of the guide rail 16. The segment 22 thus forms a discarding device in the same way as the blowing-out device 27 mentioned above. The segment 22 may be arranged in a transition region both in section C and in section D.

The separating device 15 in front of the region of the holding-down element 24 may be guided almost as far as the upper face of the receiving surface 4, in order to be able to feed superfluous or unsorted preforms 10 back to the sorting process.

Figure 6:
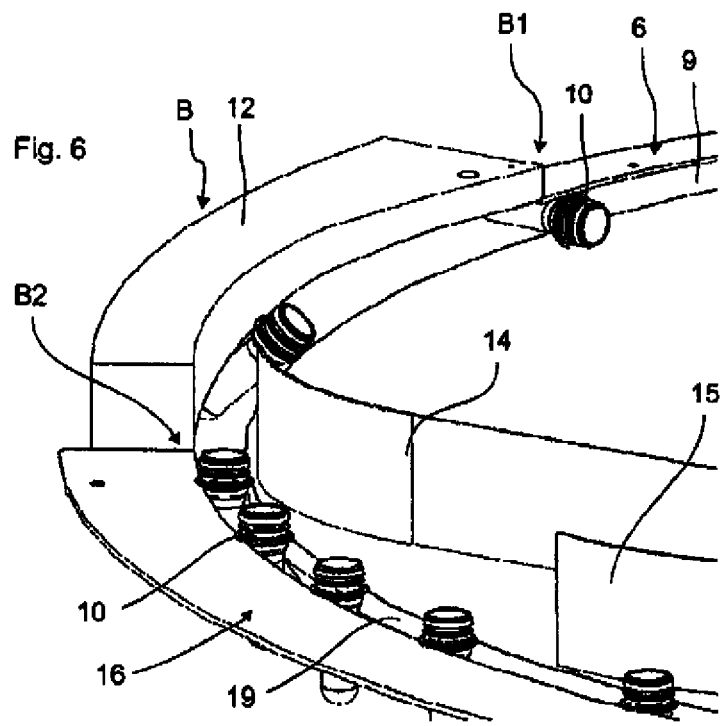
FIG. 6 shows a detail view of the turning device.

FIG. 6 shows the region B of an apparatus according to the invention, more specifically that section within which the preforms 10 are turned. It can be seen that the preforms 10 coming from the first guide rail 6 are still in a horizontal position, and then are tilted by approx. 90° in the region of the turning device and finally are located in the vertical position in the second guide rail 16. As can be seen from FIG. 6, the turning device 12 has no holding-down elements, so that even incorrectly oriented preforms 10 can pass through it.

FIG. 7 shows a detailed view of the turning device 12. This turning device 12 has a protrusion 26 in the form of a flat plate, wherein this protrusion forms the radial contour which is used for turning the containers 10. Also provided is a receiving region 127 which forms a contour perpendicular to the upper face of the receiving surface 4. More specifically, this receiving region 127 defines the precise position of the protrusion 26 relative to the receiving surface 4, so that on the one hand it is raised in terms of its height from right to left in FIG. 7 and on the other hand likewise moves closer to the receiving surface 4 from right to left in the radial direction thereof. A three-dimensional contour of the protrusion 26 is obtained by fixing the protrusion or flat plate 26 to the receiving region 127.

By virtue of the protrusion 26, an advantageous guidance of the preforms 10 in the turning device 12 may be achieved.

FIG. 8 shows a plan view of an installation 30 according to the invention. Here, the apparatus 1 is no longer shown in detail. The apparatus 1 is adjoined firstly by a disc wheel 32 which rotates in the clockwise direction and in this way conveys the preforms 10 in the direction of a synchronisation star wheel 34. This synchronisation star wheel 34 picks up individually the preforms 10 conveyed in the direction thereof and transfers said preforms to a downstream module, such as a blowing machine, a preform internal cleaning system, an inspection device or the like.

The distance between the centre ZE of the synchronisation star wheel 34 and the outer circumference of the receiving surface 4 is in some aspects less than about 1500 mm, that is to say that the synchronisation star wheel 34 is arranged in the direct vicinity of the receiving surface 4.

Figure 9:
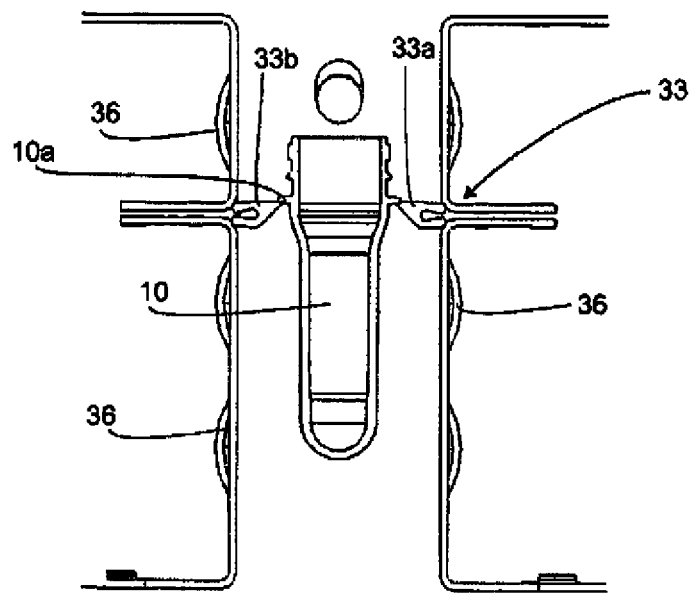
FIG. 9 shows a side view of a transfer rail.

Provided between the driven wheel 32 and the synchronisation star wheel 34 is a guide rail 33 which is shown in more detail in FIG. 9. Also within this guide rail 33, the preforms 10 are conveyed at their support ring 10a by two protrusions 33a and 33b located opposite one another. Also provided within this transfer rail 33 are a large number of air discharge openings 36 which are likewise oriented in such a way that they convey the preforms 10 in the direction of the synchronisation star wheel.

Figure 10:
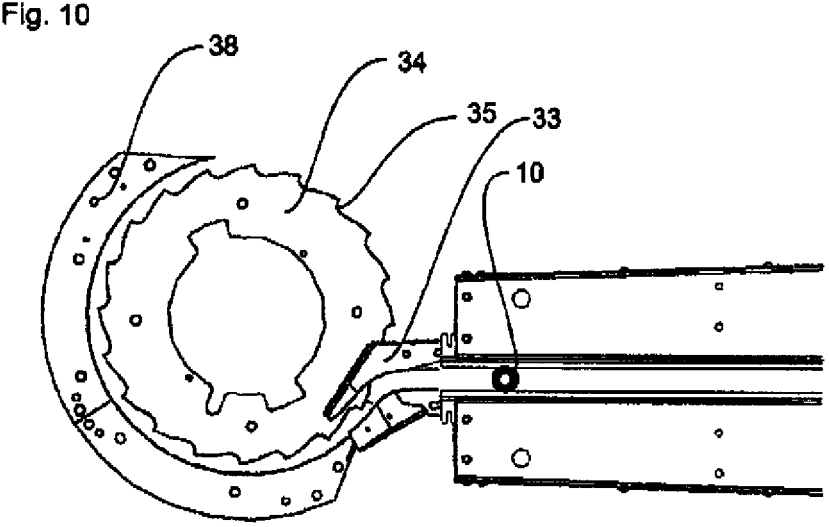
FIG. 10 shows a further detail view of the installation of FIG. 8.

FIG. 10 shows a further detail view of a transfer region to the synchronisation star wheel 34. It can be seen that the synchronisation star wheel 34 has recesses 35 in which individual preforms can be placed in each case. Also provided is an annular segment 38 which likewise serves for supporting the preforms 10.

Figure 11:
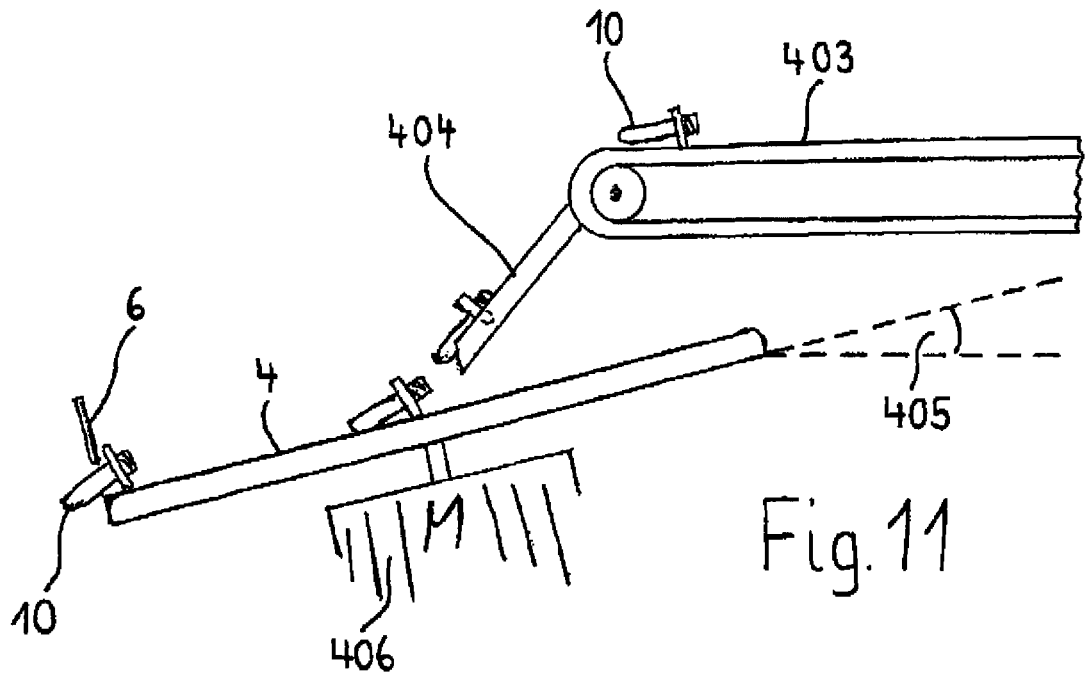
FIG. 11 shows a side view of one embodiment of the invention.

FIG. 11 shows another embodiment of the invention, in which the preforms 10 are supplied on a dispensing belt 403 which is designed to revolve endlessly. The preforms 10 are conveyed by the dispensing belt 403 to a dispensing rail 404, where they slide in the direction of the receiving surface 4 under the force of gravity. The receiving surface 4 is equipped with a drive unit 406 and is arranged at an angle 405 with respect to a horizontal. This angle is between about 5° and about 30°, and in some aspects between about 20° and about 25°. An advantage of this inclination with respect to the horizontal may be the positive assistance provided to the sorting process by a force of gravity component which acts on the preforms 10 as they move towards the first guide rail 6.

Figure 12:
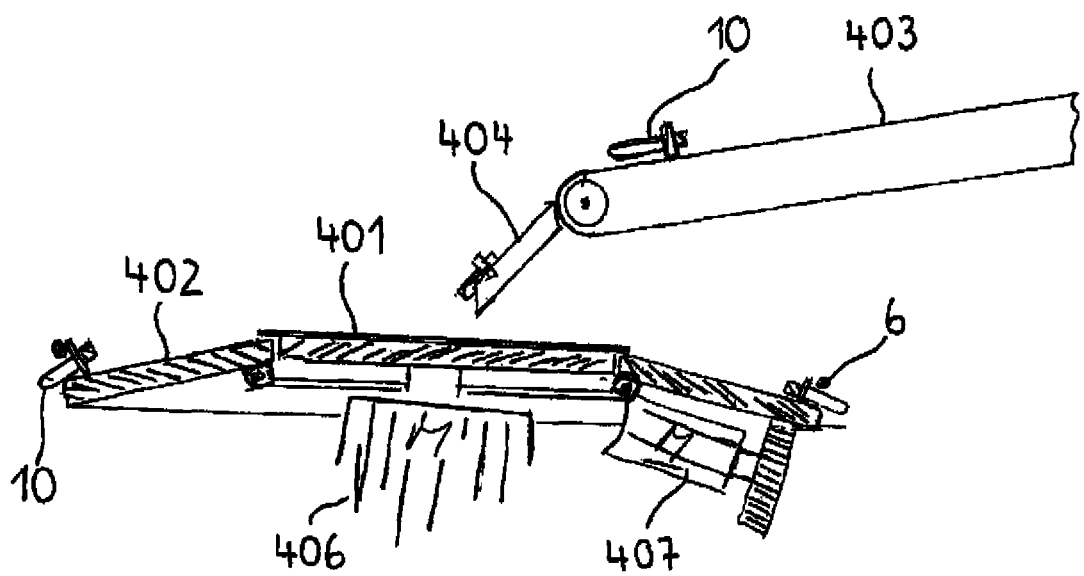
FIG. 12 shows a side view of a further embodiment of the invention.

Another embodiment of the invention consists in configuring the receiving surface 4 in two parts, so as to form a central region 401 in the form of a disc and an outer region 402 in the form of a ring around the central region 401. This configuration is shown in a side view in FIG. 12, wherein here the preforms 10 are again supplied by means of a dispensing belt 403 and a dispensing rail 404. An advantage of this arrangement may be in the better controllability of the sorting process, since the central region 401 and the outer region 402 can be driven separately at different speeds and thus the sorting speed or sorting intensity can be controlled. The ability to be driven differently is provided by a drive unit 406 which is actively connected to the central region 401, and a ring drive 407 which is actively connected to the outer region 402. It may be advantageous if the outer region 402 is arranged at an angle with respect to the horizontal. The combination of the different drivability of the central region 401 and outer region 402 and the angled arrangement of the outer region 402 with respect to the horizontal may be advantageous.

It will be apparent to those skilled in the art that various modifications and variations can be made to the apparatus for sorting performs and other bodies of the present disclosure without departing from the scope of the invention. Other embodiments of the invention will be apparent to those skilled in the art from consideration of the specification and practice of the invention disclosed herein. It is intended that the specification and examples be considered as exemplary only.

What is claimed is:

1. An apparatus for sorting piece goods, comprising:
   a receiving surface which can rotate about a predefined rotation axis and is designed to receive the piece goods;
   a first guide rail for guiding the piece goods, the first guide rail being spaced from the receiving surface so as to form a gap therebetween, the gap being sized and arranged such that one region of each of the piece goods is permitted to pass through said gap while another region of each of the piece goods is prevented from passing through said gap and is held by the first guide rail and the receiving surface;
   a turning device which pivots at least some of the piece goods in a longitudinal plane of the piece goods; and
   at least one separating device which separates out some of the piece goods, the turning device being upstream of the separating device in the movement direction of the piece goods wherein the apparatus further comprises a feed device for feeding the piece goods to the receiving surgace, an end section of the feed device being spaced apart from the receiving surface by less than 300 mm.

2. Apparatus according to claim 1, wherein the turning device is adjoined by a second guide rail, wherein the second guide rail forms a second gap through which one region of the piece goods passes and by means of which another region of the piece goods is held.

3. Apparatus according to claim 2, further comprising movement-promoting devices along the second guide rail configured to promote the movement of the piece goods in the movement direction.

4. Apparatus according to claim 2, wherein the second gap of the second guide rail is defined by an at least partially annular body, wherein at least one section of this annular body is movable in a direction running radially with respect to the receiving surface.

5. Apparatus according to claim 2, further comprising a holding-down element in at least one section of the second guide rail, the holding-down element preventing the piece goods from sliding out of the second guide rail in their longitudinal direction.

6. Apparatus according claim 2, further comprising at least one sensor device which detects a position of the piece goods with respect to at least one of said guide rails.

7. Apparatus according to claim 1, wherein the end section of the feed device is spaced apart from the receiving surface by less than 200 mm.

8. Apparatus according to claim 7, wherein the end section of the feed device is spaced apart from the receiving surface by less than 150 mm.

9. Apparatus according to claim 2, further comprising a blowing-out device which blows a predefined portion of the piece goods out of the second guide rail.

10. Apparatus according to claim 1, wherein the speed of rotation of the rotatable receiving surface can be adjusted.

11. Apparatus according to claim 1, wherein the receiving surface is arranged at an angle with respect to the horizontal, said angle being between about 5° and about 30°.

12. Apparatus according to claim 1, wherein the receiving surface is configured in two parts, with a central region and an outer region, wherein the two regions can be driven independently of one another.

13. Apparatus according to claim 12, wherein the central region is arranged horizontally, while the outer region is arranged at an angle of between about 5° and about 30° with respect to the central region.

14. An installation for sorting piece goods, comprising an apparatus for sorting piece goods, including
   a receiving surface which can rotate about a predefined rotation axis and is designed to receive the piece goods;
   a first guide rail for guiding the piece goods, the first guide rail being spaced from the receiving surface so as to form a gap therebetween, the gap being sized and arranged such that one region of each of the piece goods is permitted to pass through said gap while another region of the piece goods is prevented from passing through said gap and is held by the first guide and the receiving surface;
   a turning device which pivots at least some of the piece goods in a longitudinal plane of the piece goods; and
   at least one separating device which separates out some of the piece goods, the turning device being upstream of the separating device in the movement direction of the piece goods; and
   a synchronisation star wheel arranged downstream with respect to the movement direction of the piece goods, said star wheel being configured to pick up the piece goods from the apparatus wherein the distance between the center of the synchronization star wheel and the apparatus is less than 2000 mm.

15. Installation according to claim 14, further comprising a driven wheel between the apparatus and the synchronisation star wheel, said driven wheel being configured to move the piece goods at least partially.

16. Installation according to claim 14, wherein the distance between the centre of the synchronisation star wheel and the apparatus is less than 1500 mm.

17. Installation according to claim 14, further comprising a transfer rail between the apparatus and the synchronisation star wheel, the transfer rail including a plurality of air discharge openings which promote the movement of the piece goods.

18. Installation according to claim 17, wherein the air discharge openings are arranged both above and below the transfer rail.

19. Method for sorting piece goods, comprising:
placing the piece goods on a rotatable receiving surface;
passing the piece goods to a first guide rail, the first guide rail being spaced from the receiving surface so as to form a gap sized and arranged such that one region of each of the piece goods is permitted to pass through said gap while another region of each of the piece goods is prevented from passing through said gap and is held by the first guide rail and the receiving surface;
pivoting at least some of the piece goods in their longitudinal plane by means of a turning device; and
separating out at least some of the piece goods that have passed the turning device, wherein the apparatus further comprises a feed device for feeding the piece goods to the receiving surface, an end section of the feed device being spaced apart from the receiving surface by less than 300 mm.

* * * * *